(12) United States Patent
Yang

(10) Patent No.: US 12,122,440 B2
(45) Date of Patent: Oct. 22, 2024

(54) FOLDABLE CART WITH STABILIZING HANDLE DEVICE

(71) Applicant: Zhejiang Hengfeng Top Leisure Co., Ltd., Zhejiang (CN)

(72) Inventor: Baoqing Yang, HangZhou (CN)

(73) Assignee: Zhejiang Hengfeng Top Leisure Co., Ltd., Zhejiang (CN)

( * ) Notice: Subject to any disclaimer, the term of this patent is extended or adjusted under 35 U.S.C. 154(b) by 351 days.

(21) Appl. No.: 17/668,446

(22) Filed: Feb. 10, 2022

(65) Prior Publication Data
US 2023/0042092 A1    Feb. 9, 2023

(30) Foreign Application Priority Data

Aug. 6, 2021   (CN) .......................... 202110901876.3
Aug. 6, 2021   (CN) .......................... 202121840064.4

(51) Int. Cl.
*B62B 3/02*    (2006.01)
*B62B 3/00*    (2006.01)

(52) U.S. Cl.
CPC ................ *B62B 3/02* (2013.01); *B62B 3/001* (2013.01); *B62B 2205/06* (2013.01)

(58) Field of Classification Search
CPC ....... B62B 3/02; B62B 3/001; B62B 2205/06; B62B 3/025
See application file for complete search history.

(56) References Cited

U.S. PATENT DOCUMENTS

| | | | | |
|---|---|---|---|---|
| 4,878,682 A | * | 11/1989 | Lee | ......................... B62B 3/025 211/195 |
| 5,806,864 A | * | 9/1998 | Zielinski | ................... B62B 3/02 280/42 |
| 7,731,220 B2 | | 6/2010 | Chen et al. | |
| 8,740,243 B2 | | 6/2014 | Li | |
| 10,633,010 B1 | * | 4/2020 | Zhang | ..................... B62B 3/025 |
| 11,577,766 B2 | * | 2/2023 | Horowitz | ................ B62B 5/065 |

* cited by examiner

*Primary Examiner* — James A Shriver, II
*Assistant Examiner* — Nicholas R. Kandas
(74) *Attorney, Agent, or Firm* — Thompson Coburn LLP

(57) ABSTRACT

A foldable cart has a stabilizing handle device, which includes a connecting seat. The connecting seat has a connecting groove and two connecting rods of the foldable frame of the foldable cart are pivotally connected to the connecting seat in the connecting groove. A pulling rod mechanism is pivotally connected with the connecting seat. The connecting seat has a fixing strut that extends between the connecting seat and the foldable frame. When the cart frame is folded, the two connecting rods rotate about their pivot connections with the connecting seat, so that the two connecting rods approach each other. The connecting seat is fixedly connected to the fixing strut and a pivot point on the front side of the foldable frame so that an angle between the two remains fixed, which prevents the pulling rod mechanism from toppling left and right.

13 Claims, 5 Drawing Sheets

FOLDABLE CART WITH STABILIZING HANDLE DEVICE

RELATED APPLICATION DATA

This application claims priority benefit to Chinese patent application ser. no. 202110901876.3 and utility model application ser. no. 202121840064.4, both filed Aug. 6, 2021, the disclosures of which are incorporated by reference herein.

FIELD

The present application relates to the technical field of foldable carts, and in particular to a handle device.

BACKGROUND

A cart can provide convenience for daily shopping and handling objects for a user. After use, the user can fold the cart for storage. However, the existing cart handle often topples left and right, which causes inconvenience for the user to store the cart.

Therefore, how to prevent the handle from toppling left and right has become an urgent technical problem to be solved by those skilled in the art.

SUMMARY

An object according to the present application is to provide a foldable frame with an improved handle device, where an upper end of a fixing strut of the handle device is connected to a folding rod of the frame of the foldable cart, and a lower end of the fixing strut is fixedly connected to a connecting seat, which can further limit the rotation of the connecting seat and prevent the handle device from toppling left and right.

In order to achieve the above object, a handle device is provided according to the present application, which includes a connecting seat that allows for the connection of two connecting rods that connect to the frame of the foldable cart. A rotating shaft is provided in the connecting seat. A lower end of a pulling rod mechanism may be sleeved on an outer circumference of the rotating shaft. A connecting groove is further defined in the connecting seat. Two ends of the connecting groove are hinged to ends of the two connecting rods. Opposite ends of the two connecting rods extend away from the connecting groove and are hinged to first preset points on two sides of a cart frame respectively. The connecting seat is fixedly connected to a fixing strut, and an upper end of the fixing strut is configured to be connected to a second preset point, for example, a pivot point, at an upper portion of the cart frame.

Preferably, a lower end of the fixing strut is fixedly connected to an outer side wall of the connecting groove away from the rotating shaft, and the fixing strut is perpendicular to the rotating shaft.

Preferably, a strip-shaped fixing hole, for example, and an elongated hole or a slot, extending in a direction parallel to the fixing strut is defined at the upper end of the fixing strut.

Preferably, a strip-shaped hinge hole, for example, and an elongated hole or a slot, is provided at one end of each connecting rod connected to the connecting groove, and the connecting rod is hinged to the connecting groove through the strip-shaped hinge hole.

Preferably, the handle device further includes a limiting mechanism configured to limit a rotation angle of the pulling rod mechanism.

Preferably, the handle device further includes a mounting cover mounted at an upper opening of the connecting groove, and openings configured to receive the two connecting rods are defined at two ends of the mounting cover and accommodate their pivoting during folding of the foldable frame.

Preferably, the mounting cover further includes a side cover configured to abut against an outer side wall of the connecting groove away from the rotating shaft.

Preferably, the mounting cover has a through hole penetrating along a thickness direction, and the fixing strut is configured to pass through the through hole.

The handle device provided according to the present application includes the connecting seat that allows for the connection of two connecting rods from the foldable frame. The rotating shaft is provided in the connecting seat. The pulling rod mechanism is fixedly connected to the rotating shaft. The connecting groove is further defined in the connecting seat. Two ends of the connecting groove are hinged to ends of the two connecting rods. Opposite ends of the two connecting rods extend away from the connecting groove and are operatively pivotally connected to the first preset points on two sides of the cart frame respectively. The connecting seat is fixedly connected to the fixing strut, and the upper end of the fixing strut is configured to be connected to the second preset point, for example, a pivot connection, at the upper portion of the cart frame.

The two ends of the connecting seat are hinged to the two connecting rods respectively. When the cart frame is folded, the two first preset points approach each other, and the two connecting rods rotate around their respective pivot points between the two connecting rods and the connecting seat respectively, so that the two connecting rods approach each other, to fold the handle device. The connecting seat is fixedly connected to the fixing strut and an angle between the two remains fixed. The upper end of the fixing strut is connected to the second preset point, and an angle between the connecting seat and the cart frame remains fixed after the cart frame is folded, which prevents the pulling rod mechanism from toppling left and right.

BRIEF DESCRIPTION OF THE DRAWINGS

For more clearly illustrating embodiments of the present application or the technical solutions in the conventional technology, drawings to be used in the description of the embodiments or the conventional technology will be briefly described hereinafter. Apparently, the drawings in the following description are only embodiments of the present application. For those skilled in the art, other drawings may be obtained based on the provided drawings without any creative work.

Figure 1:
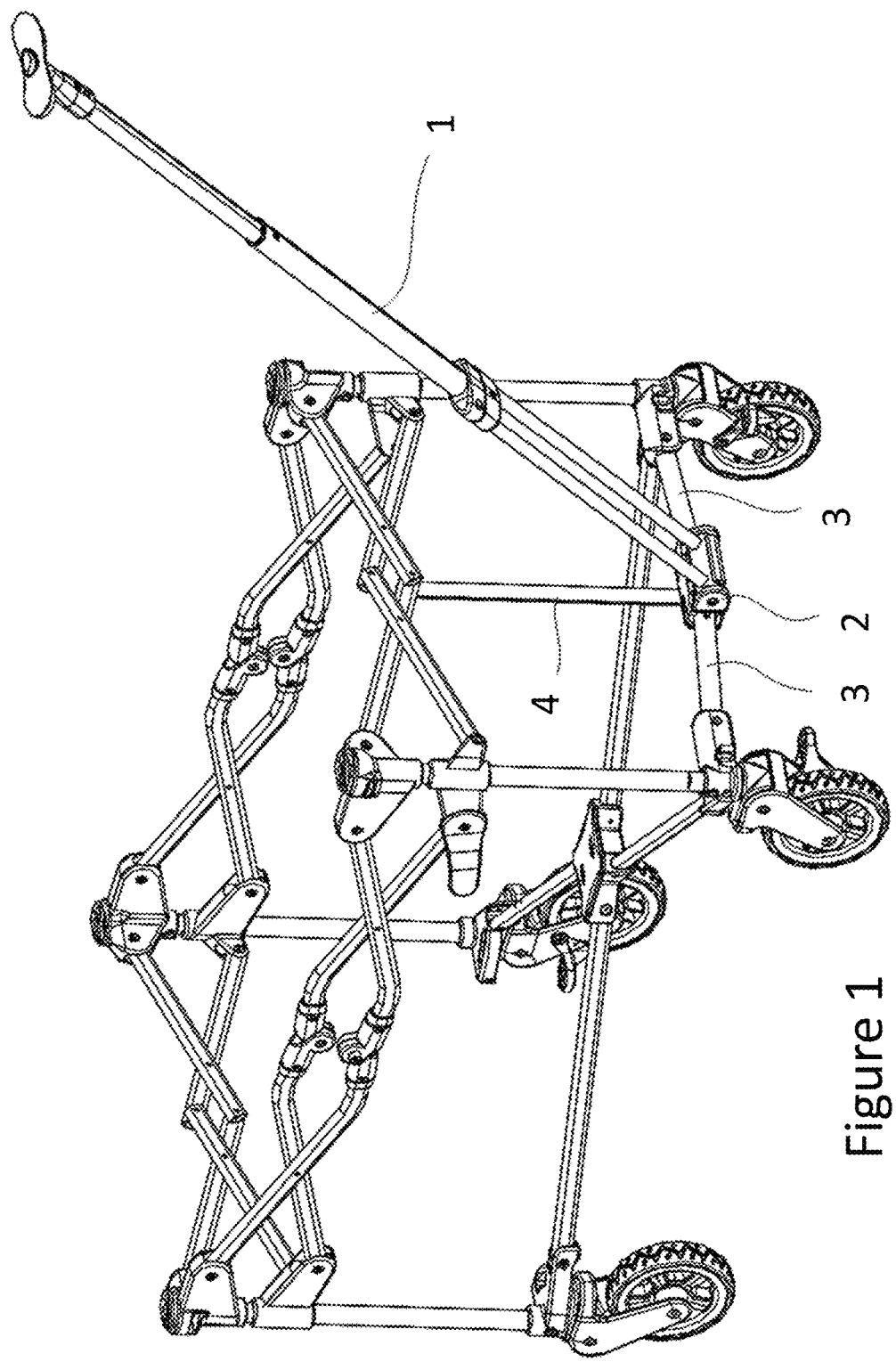
FIG. 1 is a schematic structural view of a handle device provided according to the present application and mounted in a foldable cart.

The reference numerals in FIGS. 1 to 5 are as follows:

| | |
|---|---|
| 1 pulling rod mechanism, | 2 connecting seat, |
| 3 connecting rod, | 4 fixing strut, |
| 5 mounting cover, | 11 limiting protrusion, |
| 21 connecting groove, | 31 strip-shaped hinge hole, |
| 41 strip-shaped fixing hole, | 51 avoidance opening, |
| 52 side cover, | 53 through hole. |

DETAILED DESCRIPTION OF THE EMBODIMENTS

Technical solutions of embodiments of the present application are clearly and completely described hereinafter in conjunction with the drawings of the embodiments of the present application. Apparently, the embodiments described in the following are only some embodiments of the present application, rather than all embodiments. Based on the embodiments in the present application, all of other embodiments, made by the person skilled in the art without any creative efforts, fall into the scope of protection of the present application.

In order to enable those skilled in the art to better understand the solution of the present application, the present application will be further described in detail below in conjunction with the accompanying drawings and specific embodiments.

Figure 2:
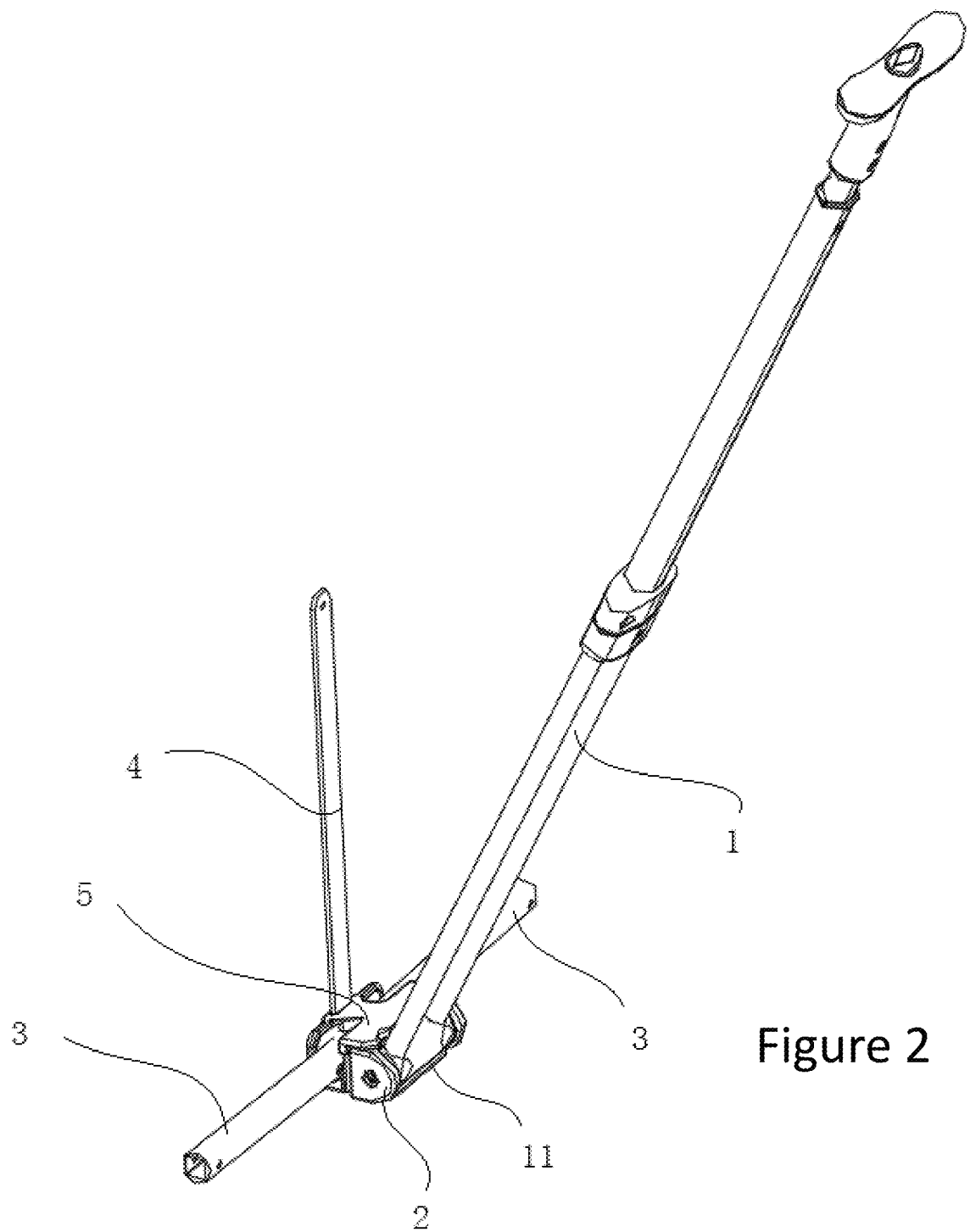
FIG. 2 is a schematic structural view of a specific embodiment of the handle device provided according to the present application.
Figure 3:
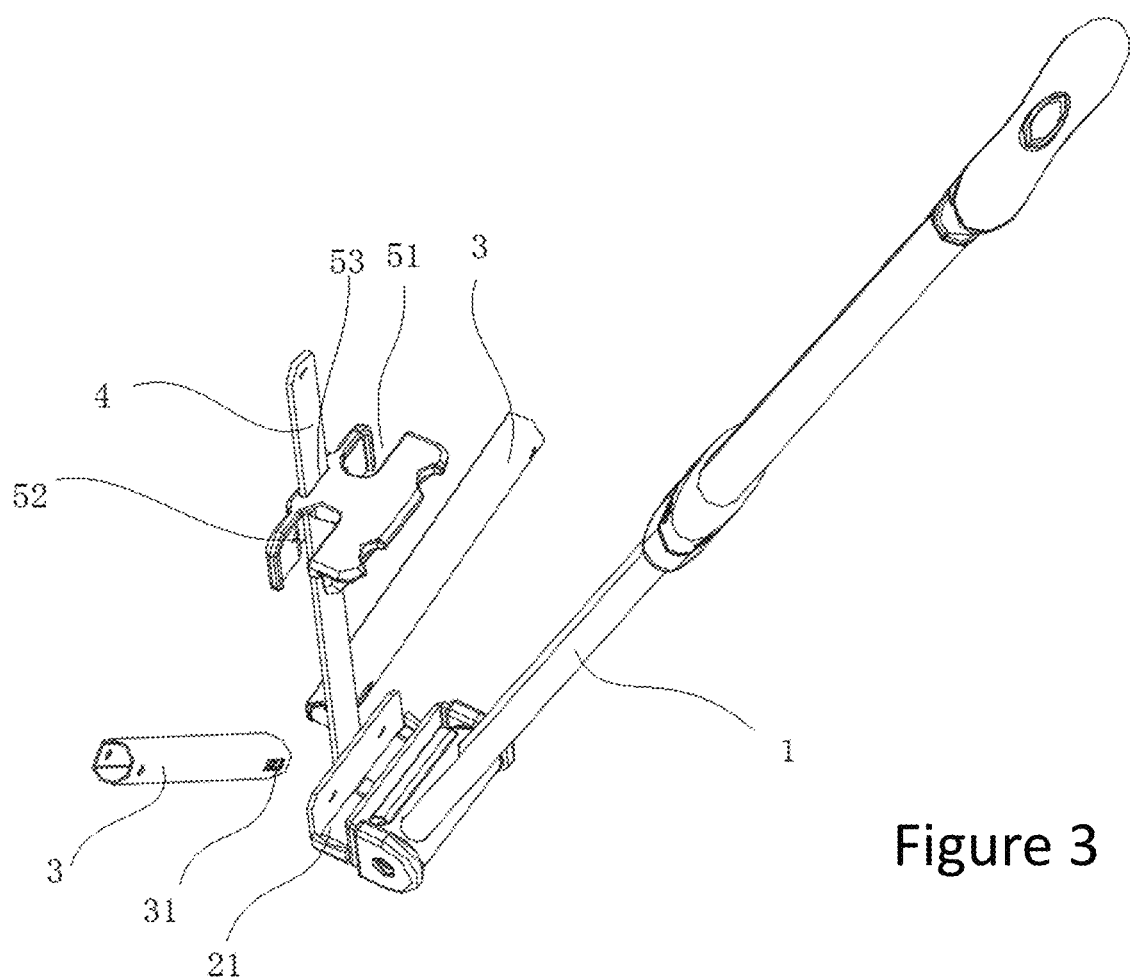
FIG. 3 is an exploded view of the handle device in FIG. 2.
Figure 4:
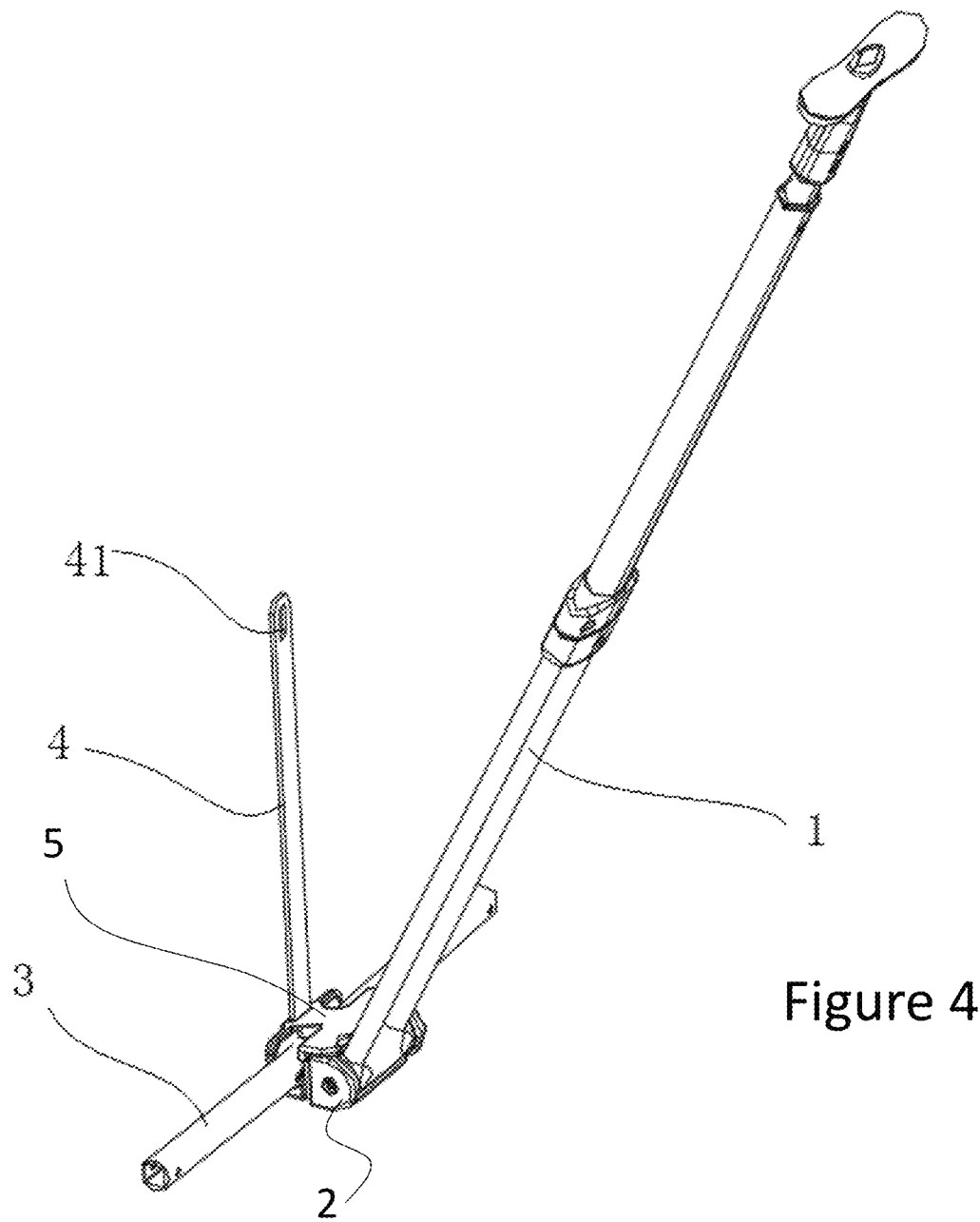
FIG. 4 is a schematic structural view of another specific embodiment of the handle device provided according to the present application.
Figure 5:
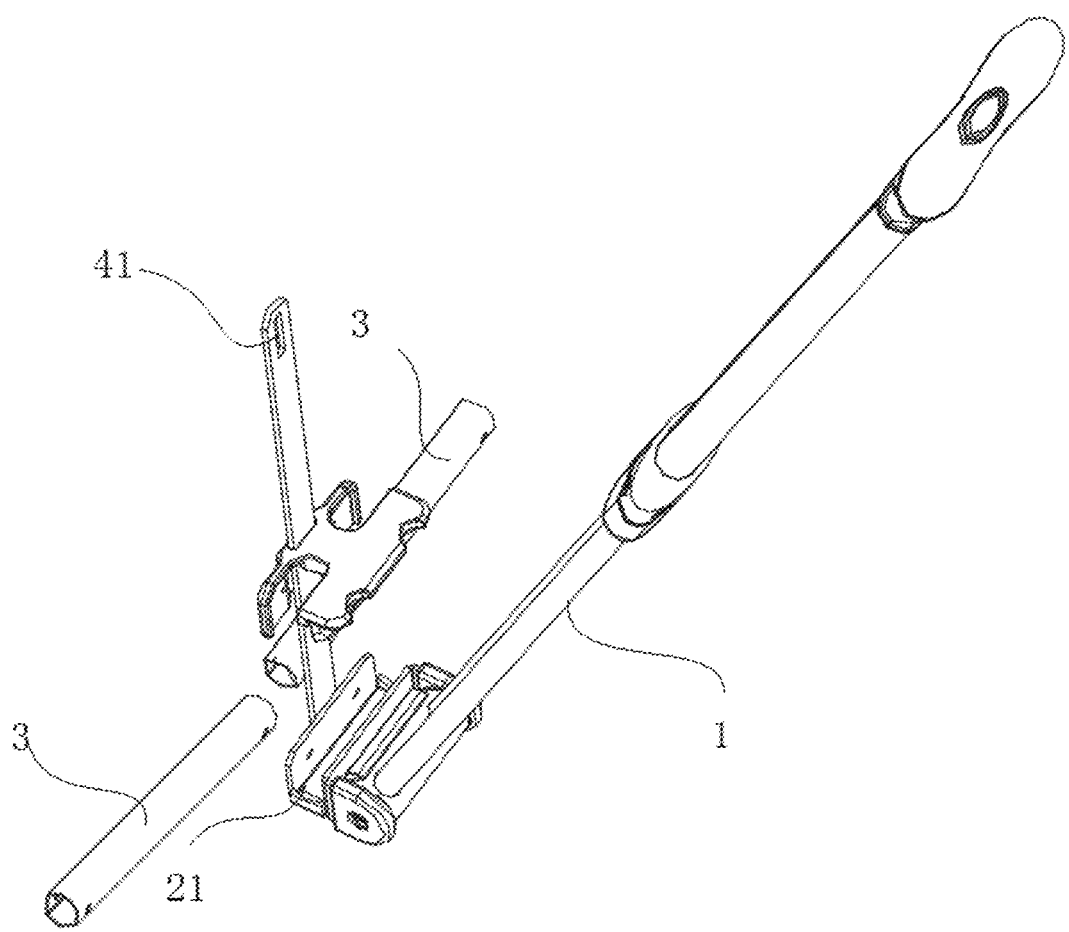
FIG. 5 is an exploded view of the handle device in FIG. 4.

Referring to FIGS. 1 to 5, FIG. 1 is a schematic structural view of a foldable cart with a handle device provided according to the present application. FIG. 2 is a schematic structural view of a specific embodiment of the handle device provided according to the present application. FIG. 3 is an exploded view of the handle device in FIG. 2. FIG. 4 is a schematic structural view of another specific embodiment of the handle device provided according to the present application. FIG. 5 is an exploded view of the handle device in FIG. 4.

The foldable cart with the handle device provided according to the present application, with a structure shown in FIG. 2 or 4, includes a pulling rod mechanism 1, a connecting seat 2, two connecting rods 3 and a fixing strut 4. The connecting seat 2 includes a connecting groove 21 and a rotating shaft seat, and the rotating shaft seat has a rotating shaft arranged in a direction parallel to a connecting shaft. A lower end of the pulling rod mechanism 1 is provided with a connecting sleeve, and the connecting sleeve is sleeved on an outer circumference of the rotating shaft, so that the pulling rod mechanism 1 can swing back and forth around the rotating shaft. Ends of the two connecting rods 3 are respectively hinged to two ends of the connecting groove 21, so that the two connecting rods 3 can rotate left and right around hinge points between the two connecting rods 3 and the connecting groove 21. Another ends of the two connecting rods 3 away from the connecting groove 21 are hinged to a cart frame by connecting sleeves. As shown in FIG. 1, the connecting sleeves are sleeved on outer circumferences of a left column and a right column in the front of the cart frame, and a hinge shaft arranged in a front-rear direction is provided on each connecting sleeve. A hinge hole is defined at one end of each connecting rod 3 away from the connecting groove 21, the hinge shaft is inserted into the hinge hole, so as to realize the hinge between the connecting rod 3 and the cart frame. A position of the hinge shaft is a first preset point. The two first preset points are generally symmetrically distributed on two sides of the cart frame, and lengths of the two connecting rods 3 are the same.

A lower end of the fixing strut 4 is fixedly connected to the connecting seat 2. A folding frame is provided at an upper portion of the cart frame, and a midpoint of the folding frame is a hinge point of the two folding rods. In a specific embodiment according to the present application, the midpoint is selected as a second preset point, and an upper end of the fixing strut 4 is connected to the second preset point. After the cart frame is folded or unfolded, the midpoint of the folding frame is always located in the middle of a front end of the cart frame, so that an angle between the connecting seat 2 and the cart frame is almost unchanged, which also keeps the pulling rod mechanism 1 close to a center line of the front end of the cart frame and keeps the pulling rod mechanism 1 from toppling left and right. In addition, the user may also select other point which has a relatively small change in a distance ratio from left and right sides of the cart frame when folded or unfolded, and the second preset point is generally located above the connecting seat 2.

Optionally, a lower end of the fixing strut 4 is fixedly connected to the middle of an outer side wall of the connecting groove 21 away from the rotating shaft, and the fixing strut 4 is perpendicular to the rotating shaft. The pulling rod mechanism 1 is also perpendicular to the rotating shaft, so that the fixing strut 4 and the pulling rod mechanism 1 may be located in a same plane. After the cart frame is folded, the pulling rod mechanism 1 is always in the middle of the front end of the cart frame under the limitation of the fixing strut 4, so that the pulling rod mechanism 1 does not occupy additional space.

During the folding process of the cart frame, the second preset point may produce a first displacement in a vertical direction, and the connecting seat 2 may produce a second displacement in the vertical direction. The two displacements are generally different. In order to prevent the fixing strut 4 from affecting the folding of the cart frame, in a specific embodiment according to the present application, as shown in FIG. 2 and FIG. 3, a strip-shaped fixing hole 41 (slot or elongated hole) is defined at the upper end of the fixing strut 4, the strip-shaped fixing hole 41 extends in a direction parallel to the fixing strut 4. The fixing strut 4 is connected to the second preset point through the strip-shaped fixing hole 41, a length of the strip-shaped fixing hole 41 is greater than a difference between the first displacement and the second displacement. Therefore, the strip-shaped fixing hole 41 can prevent the fixing strut 4 from affecting the folding process of the cart frame.

In another specific embodiment according to the present application, as shown in FIG. 4 and FIG. 5, a strip-shaped hinge hole 31 (slot or elongated hole) is provided at one end of each connecting rod 3 connected to the connecting groove 21, the strip-shaped hinge hole 31 is parallel to the connecting rod 3, and the connecting rod 3 is hinged to the connecting groove 21 through the strip-shaped hinge hole 31. A length of the strip-shaped hinge hole 31 is greater than the difference between the first displacement and the second displacement. During the folding process of the cart frame, the fixing strut 4 can drive the connecting seat 2 to move in the strip-shaped hinge hole 31, which can also prevent the fixing strut 4 from affecting the folding process of the cart frame.

Optionally, in order to facilitate the pulling of the user, the pulling rod mechanism 1 generally does not need to rotate by an excessively large angle. Therefore, a limiting mechanism configured to limit a rotation angle of the pulling rod mechanism 1 is provided in the handle device. As shown in FIG. 1, a limiting protrusion 11 is provided on an outer side wall of the connecting sleeve at the lower end of the pulling rod mechanism 1, and the limiting protrusion 11 can abut against the connecting seat 2 to limit the rotation of the pulling rod mechanism 1. Alternatively, the user can use a limiting mechanism with other structure, which is not limited here.

In order to prevent dirt and debris from entering the connecting groove 21, the handle device is provided with a mounting cover 5, the mounting cover 5 is mounted at an upper opening of the connecting groove 21 to prevent dirt and debris from entering the connecting groove 21. Avoidance openings 51 are defined at two ends of the mounting cover 5, and the two connecting rods 3 can enter the two avoidance openings 51 after the cart frame is folded.

As shown in FIG. 3, the mounting cover 5 further includes a side cover 52 bent downward, and the side cover 52 is configured to abut against an outer side wall of the connecting groove 21 away from the rotating shaft. A fixing grove is defined at an edge of the side cover 52, and the fixing groove is clamped with the outer side wall of the connecting groove 21 away from the rotating shaft, so that the mounting cover 5 is fixed to the connecting groove 21.

Furthermore, an upper end surface of the mounting cover 5 has a through hole 53 penetrating along a thickness direction, and the fixing strut 4 is configured to pass through the through hole 53. Therefore, the mounting cover 5 can protect a connection between the fixing strut 4 and the connecting seat 2.

In this embodiment, the fixing strut 4 is provided in the handle device, the fixing strut 4 is fixedly connected to the connecting seat 2, and the upper end of the fixing strut 4 is connected to the second preset point on the cart frame. After the cart frame is folded, the fixing strut 4 can prevent the connecting seat 2 from rotating, which prevents the pulling rod mechanism 1 from swinging left and right.

It should be noted that, relationship terms herein such as first and second are merely used to distinguish an entity from other entities and do not require or imply that there are any such actual relationships or sequences between these entities.

The handle device according to the present application has been described in detail hereinbefore. The principle and the embodiments of the present application are illustrated herein by specific examples. The above description of examples is only intended to facilitate the understanding of the method and spirit of the present application. It should be noted that, for those skilled in the art, many improvements and modifications may be further made to the present application without departing from the principle of the present application, and these improvements and modifications also fall within the protection scope of claims of the present application.

The invention claimed is:

1. A foldable cart having a foldable frame and a handle device, the handle device comprising a connecting seat, the handle device having a pulling rod mechanism, a lower end of the pulling rod mechanism being operatively pivotally connected with the connecting seat and an opposite end of the pulling rod mechanism being adapted to grasped by a user of the foldable cart, the connecting seat having a connecting groove, one connecting rod of the foldable frame is operatively pivotally to the connecting seat adjacent one end of the connecting groove and another connecting rod of the foldable frame is operatively pivotally connected to the connecting seat adjacent to an opposite end of the connecting groove, opposite ends of the two connecting rods extend away from the connecting groove and are operatively pivotally connected to the foldable frame, the handle device has a fixing strut, one end of the fixing strut is connected to the connecting seat, an opposite end of the fixing strut is connected to a pivot point of the foldable frame.

2. The foldable cart according to claim 1, wherein the connecting seat has a clevis portion and a rotating shaft extending between arms of the clevis portion, and the lower end of the pulling rod mechanism extends around the rotating shaft.

3. The foldable cart according to claim 1, wherein the lower end of the fixing strut is fixedly connected to an outer side wall of the connecting groove away from the connection of the pulling rod mechanism with the connecting seat, the fixing strut is in the same plane as the pulling rod mechanism.

4. The foldable cart according to claim 1, wherein the fixing strut has a strip-shaped fixing hole extending in a direction parallel to the fixing strut at the upper end of the fixing strut.

5. The foldable cart according to claim 1, each of the connecting rods has a strip-shaped hinge hole, and the respective connecting rod is hinged to the connecting seat in the connecting groove through the strip-shaped hinge hole.

6. The foldable cart according to claim 1, wherein the handle device further comprises a limiting mechanism on the connecting seat configured to limit rotation of the pulling rod mechanism relative to the connecting seat.

7. The foldable cart according to claim 1, wherein the handle device further comprises a mounting cover mounted to the connecting seat over the connecting groove, the mounting cover having openings configured to accommodate pivoting of the connecting rods relative to the connecting seat.

8. The foldable cart according to claim 7, wherein the mounting cover further comprises a side cover configured to abut against an outer side wall of the connecting groove away from the connection of the pulling rod mechanism with the connecting seat.

9. The foldable cart according to claim 7, wherein the mounting cover has a through hole, and the fixing strut passes through the through hole.

10. The foldable cart according to claim 7, wherein the mounting cover covers a portion of the connection of the pulling rod mechanism to the connecting seat.

11. The foldable cart according to claim 1, wherein the foldable frame comprises a pair of folding bar assemblies on a front side of the foldable cart, one folding bar assembly has an upper leg inner end joined to an upper leg inner end of the other folding bar assembly and a lower leg inner end joined to a lower leg inner end of the other folding bar assembly, the fixing strut is connected to the lower leg inner ends of folding bar assemblies.

12. The foldable cart according to claim 11, wherein each folding bar assembly has an upper leg outer end and a lower leg outer end, the upper leg outer end of each folding bar assembly is operatively connected to a vertically oriented pole at a respective corner of the foldable frame, the lower leg outer end of each folding bar assembly is operatively slidingly connected to the vertically oriented pole at the respective corner of the foldable frame.

13. The foldable cart according to claim 11, wherein the fixing strut has a strip-shaped fixing hole, and the fixing strut is connected to the lower leg inner ends of folding bar assemblies through the strip-shaped fixing hole.

\* \* \* \* \*